Figure 1:
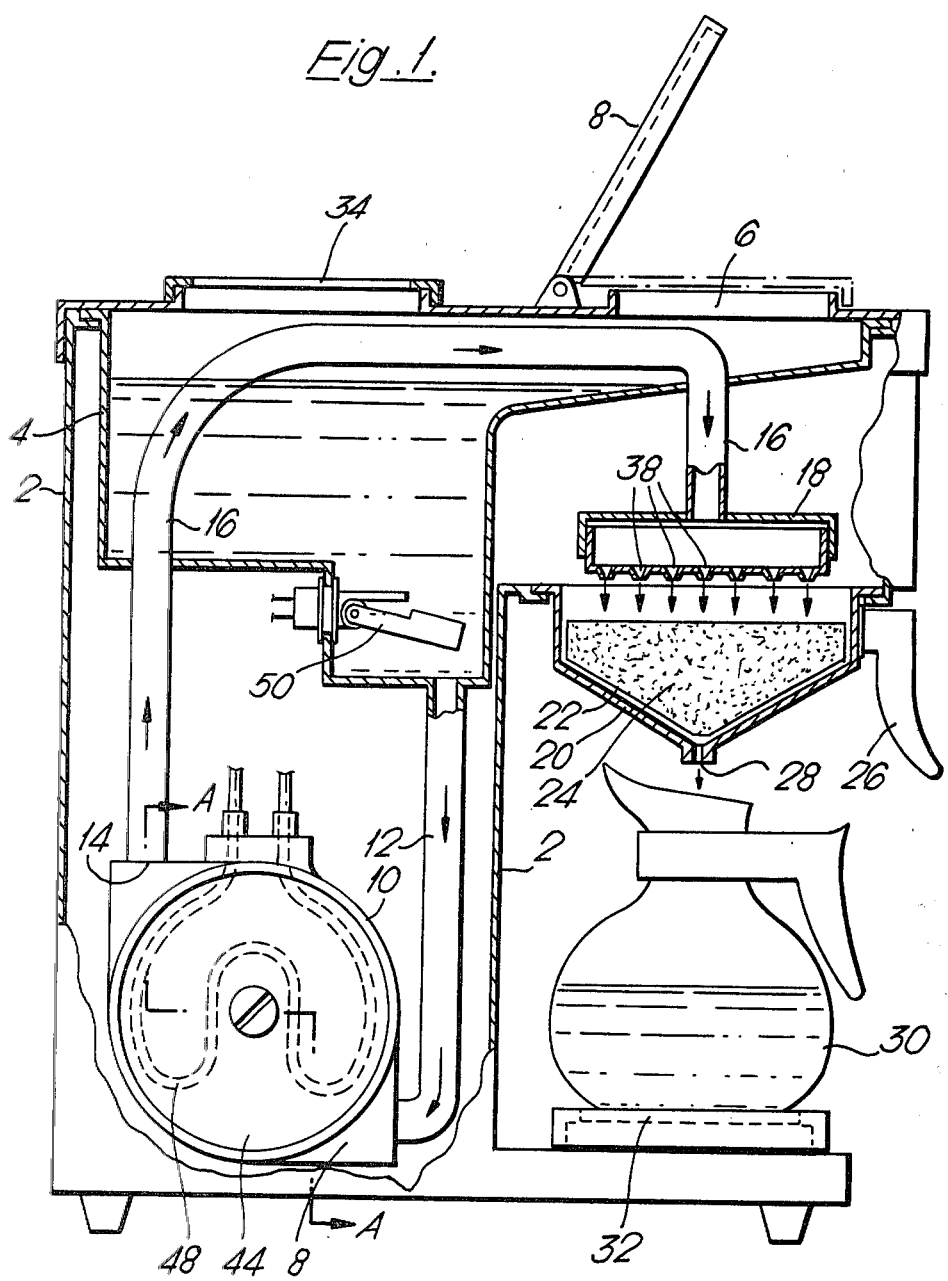

United States Patent [19]

Filipowicz et al.

[11] 4,354,427
[45] Oct. 19, 1982

[54] COFFEE AND TEA MAKING OR BREWING APPARATUS

[75] Inventors: Maciej K. Filipowicz, St. Leonards-on-Sea; Cecil Hayes, Hastings, both of England

[73] Assignee: W. M. Still & Sons Limited, East Sussex, England

[21] Appl. No.: 164,234

[22] Filed: Jun. 30, 1980

[51] Int. Cl.³ .............................................. A47J 31/10
[52] U.S. Cl. ........................................ 99/307; 99/295
[58] Field of Search ................ 99/308, 309, 310, 311, 99/312, 313, 314, 315, 307, 295, 302 R, 304, 306; 239/589

[56] References Cited

U.S. PATENT DOCUMENTS 2,866,401 12/1958 Sidell ..................................... 99/312
3,080,810 3/1963 Saint ..................................... 99/315
3,371,593 3/1968 Price ..................................... 99/307

Primary Examiner—Robert W. Jenkins
Attorney, Agent, or Firm—Wood, Herron & Evans

[57] ABSTRACT

Coffee and tea making or brewing apparatus of the type in which heated water is caused to flow through a spray head, the resulting spray impinging on a bed of ground coffee (or tea) through which the hot water passes to produce coffee or tea liquor.

In accordance with the invention the spray head is provided with a number of dimples. The heads of the dimples being provided or formed with a surface to which a drop of liquid emerging through a spray hole in the dimple, may cling.

With this construction the drops fall over the coffee or tea bed in a random fashion which may be compared with raindrops and this helps properly to prevent nuclei being formed in the coffee bed.

5 Claims, 4 Drawing Figures

COFFEE AND TEA MAKING OR BREWING APPARATUS

This invention relates to coffee and tea making or brewing apparatus and especially to apparatus of the type in which heated water is caused to flow through a spray head, the resulting spray impinging on a bed of ground coffee (or tea) through which the hot water passes to produce coffee or tea liquor.

Conventional apparatus of this type suffers from two disadvantages. The first disadvantage is that when the water spray enters the spray head or infuser at too fast a speed, it may act to lift the coffee bed which is normally held in a basket or container of the infuser and which may be lined with removable filter paper. The light ground coffee then floats above the water in the infuser causing inefficient infusion.

The second disadvantage occurs if water is allowed to enter the infuser at too slow a rate from the spray head. The water jet emerging from one particular hole in the spray head then impinges the bed of coffee to form a nuclei from which the wetting action of the coffee bed starts with the result that the strength of coffee or the efficiency of the infusion depends upon the number of nuclei thus formed. The number of such neclei of infusion is limited to the number of holes in the spray head disc and even with a fairly large number of such holes, the nuclei do not cover the full area of the coffee bed. Infusion is more efficient at the point of impingement of the jet of spray from an individual spray hole and is less between the nuclei and this factor considerably diminishes the infusion efficiency.

A coffee or tea making or brewing apparatus in accordance with the invention has a spray or infuser head which is provided with a number of dimples, preferably downwardly extending, the heads of the dimples being provided or formed with a surface to which a drop emerging through a spray hole in the dimple, may cling.

The dimple head may be flattened in which case it has been found that water drops adhere to the underneath of the flat portion of the dimple around each spray hole by surface tension and droplets are thus formed beneath each dimple. Alternatively the head of the dimple may be recessed upwardly in which case the drops adhere to the upwardly sloping surfaces terminating in the respective spray holes. With either construction the drops fall over the coffee (or tea) bed in the infuser in a random fashion which may be compared with raindrops. This helps to prevent nuclei being formed in the coffee bed. The frequency of droplets can be adjusted by varying the flow of water to the heater and/or the flow of water from the heater to the spray head so as not to allow the coffee bed to be flooded or cause the bed to be lifted.

It is also believed that the small head of water provided by the dimple formation in the spray head helps to cause the formation of droplets as compared merely with a liquid being forced as a jet through a hole in a flat plate.

The coffee or tea making or brewing apparatus may have a water heater having a passage connected, at its inlet side, to a source of, or reservoir for, cold or unheated water and, at its outlet side, to the spray head from which heated water is sprayed over the bed of coffee, the heater being so arranged that water is heated during its flow through the heater passage to such a temperature as to produce steam, the pressure of which then acts to force heated water through the outlet to the spray head without the need of a separate water pump. The arrangement of the dimples enables a constant supply of droplets despite irregular deliveries of heated water to the spray head.

This helps considerably in achieving satisfactory consistency of brewed coffee (or tea) as the consistency depends on the temperature of water impinging on the bed of coffee. With the apparatus of the invention, water is always at, or only just below, boiling point when it impinges on the coffee as it is the steam formed inside the heater unit which causes the necessary pressure to move the water from the heater to the spray head and to then flow through the spray head. This provides a significant advantage as compared with conventional apparatus in which the temperature of water being sprayed on the coffee (or tea) bed depends on the initial ambient temperature of water being fed to the heater whereas in the arrangement of the invention, the temperature of water impinging on the coffee bed is independent of the temperature of water supplied to the heater.

More than one heater unit can be employed to increase output but each heater is preferably formed of a metal block, such as aluminium, having a "cast-in" heating element(s) which is located adjacent the water passage.

Figure 2:
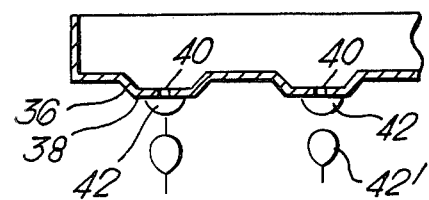
Figure 3:
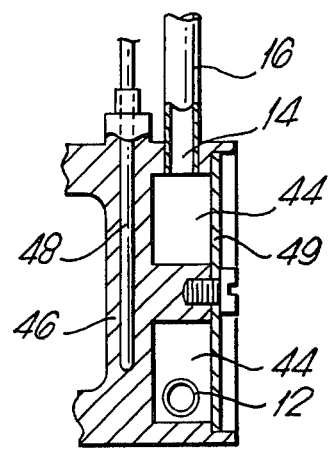
Figure 4:
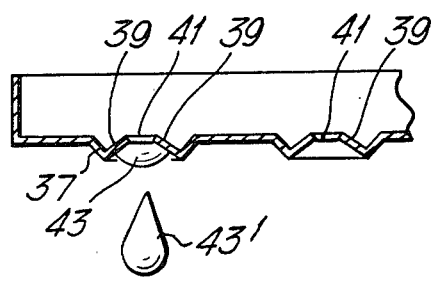

The invention will now be further described by way of example with reference to the accompanying sketch drawings, in which:

FIG. 1 is a schematic side elevation of one embodiment of coffee making apparatus in accordance with the invention, FIG. 2 is a section through a part of one embodiment of spray head on an enlarged scale, FIG. 3 is a section on the line A—A of FIG. 1 illustrating further features of the heating unit and FIG. 4 is a sketch view of an alternative arrangement of spray head.

Referring to FIG. 1, the coffee making apparatus comprises a casing or body 2 having an internal cold water tank 4 positioned at its top and having an inlet 6 through the top of the casing 2 to receive cold water from a flask, which inlet may be closed by cover 8.

The cold water tank 4 is connected to an inlet 8 of a heater unit generally indicated at 10, by means of a pipe 12. The heated water flows from the heater through an outlet 14 to a pipe 16 which passes up adjacent the cold water tank 4 and connects with a spray head 18 positioned above the coffee infuser basket 20. The basket is lined with a removable filter paper 22 on which is positioned a bed of ground coffee 24. As is conventional, the infuser basket 20 can be lifted out from the apparatus using its handle 26, for replacement of the filter paper and bed of coffee.

The infuser basket is approximately conical in shape tapering to an outlet hole 28 positioned above a flask 30 to receive coffee liquor which is formed by hot water passing from the spray head 18 through the bed 24 of ground coffee. Coffee in the flask 30 is kept warm by a conventional heater unit 32 on which the flask sits. Equally, a warming plate 34 for a second storage flask is located at the top of the machine.

In one embodiment the spray head 18 is formed with a series of dimples 36 extending downwardly from its bottom face each dimple having a flat head 38 as can readily be seen in FIG. 2, the flat head of each dimple being pierced by a centrally positioned spray hole 40. In use, water flowing to the spray head through the pipe 16 fills the head and also the interior of the various dimples. The water then passes through the spray holes 40 to form droplets 42 which it is believed adhere, during their formation, to the flat portion of the dimples around the spray holes due to surface tension.

In the alternative construction illustrated in FIG. 4, the dimples 37 are found by bending the metal of the bottom surface of the spray head downwardly at an angle of for example 45°, and then upwardly to form upwardly sloping conical surfaces 39 terminating in a spray hole 41. Water passing through the holes 41 form droplets 43 which adhere during their formation to the surfaces 39 around the spray holes due to surface tension.

When a droplet reaches a certain size and weight, it detaches itself from the dimple to drop to the coffee bed as illustrated at 42' in FIG. 2, or 43' in FIG. 3. The dimples may have sloping sides as illustrated in FIG. 2 or may have straight sides at right angles both to the bottom surface of the spray head and to the flat surface of the dimple.

It has been found that the droplets fall in a random fashion from the spray head over the coffee bed in a manner akin to raindrops and that this provides very effective overall infusion as compared with that which is produced when a concentrated stream of liquid impinges on the bed at a specific point from each of several spray holes in a flat plate.

If the inlet to the spray head is at one end of the head, then when the head first receives heated water the head between the water level in the tank 4 and the spray head 18 is at its greatest, so the pressure generated by the heater needs only to be relatively low hence the water will tend to be discharged through the holes nearest the inlet to the enclosed head. When the level of water in the tank 18, drops the pressure generated by the heater required for discharge will be relatively high so the water will tend to be discharged through the spray holes relatively remote from the inlet.

This arrangement helps to produce a consistent brew and the consistency of brew is aided by a provision of a heater such as that illustrated at 10 which avoids the use of any separate water pump and which supplies water to the spray head at a consistent temperature.

As can be seen in FIG. 3, cold water flows into the heater through inlet 12 and into a passage 44 which circulates around the heater to communicate with the heater outlet 14 and water flow pipe 16.

The heater comprises a cast block 46 of aluminium which provides one side face of the water passage 44 and which has a heating element 48 embedded therein so that water passing through the passage 44 is heated by the element 48 through the medium of the cast metal block 46. Water flowing through the heater is heated by the heating element 48 to a temperature at which steam is produced irrespective of its temperature at the inlet. The production of steam creates pressure to cause water at, or only just below, boiling point, to flow up through the delivery tube 16 to the spray head 18. This has the advantage that the water falling on the coffee bed is always at a consistent temperature at, or just below, boiling point which temperature is ideal for the brewing of either tea or coffee.

The passage 44 through the heater is also defined by a cover plate 49 which is attached to the block 46 by a screw and which can readily be removed for cleaning and descaling.

No thermostat is provided, although a high temperature safety cut-out may be incorporated in the heater to protect the heating elements. However, the heating element is not energised until a lever switch 50 located in the passage between the cold water tank 4 and heater 10 is closed (it is shown open in FIG. 1 for clarity although it would in fact be closed if the tank 4 contains water). Thus, so long as there is water in the tank 4, the heater is energised and water will flow from the spray head 18. Once the tank is empty, the level switch will open and the heating element switched off to save energy. This means that fresh water is employed each time the machine is used for brewing as there is no storage of water in the tank.

It will be appreciated that the apparatus could incorporate more than one heating unit 10 and indeed different embodiments of heater could be used with the spray head of the invention and indeed different spray heads could be used with a heater in accordance with the invention.

It will be appreciated that whilst the invention has been described with a specific reference to apparatus of the type in which the provision of a specified amount of water to the machine through the inlet, causes an equivalent amount of coffee liquor to be produced, the invention could equally well be embodied in apparatus which is adapted to be "plumbed-in" to a consistent supply in which case a metered amount of cold water is introduced to the cold water tank. Equally the invention may be used with any type of coffee (or tea) brewer in which heated water has to be distributed through a spray head over a bed of coffee (or tea).

What we claim is:

1. Brewing apparatus for coffee and tea, said apparatus comprising a supply tank for containing a supply of water, a heater unit for heating water to boiling point and creating pressure, means to supply water from said supply tank to said heater unit, a basket for carrying a bed of one of coffee and tea, said basket being lined with a filter paper prior to receipt of said bed, hot water being passed through said bed to produce a brewed liquor, a spray head positioned above said bed, said spray head being adapted to discharge hot water on said bed, a series of dimples on the bottom of said spray head, each of said dimples defining a spray hole through which hot water can pass, each of said dimples extending downwardly beneath the bottom of said spray head so that said spray holes are positioned beneath the bottom of said spray head, and each of said dimples being provided with a surface to which a drop of hot water passing through said spray hole may cling due to surface tension of said water prior to dropping onto said bed, said dimples cooperating to distribute hot water drops over said bed in a random fashion in a manner akin to raindrops, means between said heater unit and said spray head to supply water under pressure and at, or just below, boiling point from said heater unit to said series of dimples, and means positioned beneath said bed to receive the brewed coffee or tea, said receiving means being separate from said supply tank.

2. Brewing apparatus as set forth in claim 1, said dimple surface of each dimple to which said hot water drops cling comprising a flattened surface area surrounding said spray hole, said flattened surface being positioned beneath and generally parallel to the bottom of said spray head.

3. Brewing apparatus for coffee and tea, said apparatus comprising a supply tank for containing a supply of water, a heater unit for heating water to boiling point, means to supply water from said supply tank to said heater unit, a basket for carrying a bed of one of coffee and tea, said basket being lined with a filter paper prior to receipt of said bed, hot water being passed through said bed to produce a brewed liquor, a spray head positioned above said bed, said spray head being adapted to discharge hot water on said bed, a series of dimples on the bottom of said spray head, each of said dimples defining a spray hole through which hot water can pass, each of said dimples extending downwardly beneath the bottom of said spray head so that said spray holes are positioned no higher than the bottom of said spray head, and each of said dimples being provided with a surface to which a drop of hot water passing through said spray hole may cling due to surface tension of said water prior to dropping onto said bed, said dimples cooperating to distribute hot water drops over said bed in a random fashion in a manner akin to raindrops, means between said heater unit and said spray head to supply water under pressure and at, or just below, boiling point from said heater unit to said series of dimples, and means positioned beneath said bed to receive the brewed coffee or tea, said receiving means being separate from said supply tank.

4. Brewing apparatus as set forth in claim 3, said dimple surface of each dimple to which said hot water drops cling comprising a flattened surface area surrounding said spray hole, said flattened surface being positioned beneath and generally parallel to the bottom of said spray head.

5. Brewing apparatus as set forth in claim 3, said dimple surface of each dimple to which said hot water drops cling comprising an upwardly sloping conical wall surrounding said spray hole, said wall being positioned beneath the bottom of said spray head.

* * * * *